US011297500B2

(12) United States Patent
Jain

(10) Patent No.: US 11,297,500 B2
(45) Date of Patent: Apr. 5, 2022

(54) AUTHENTICATING DIGITAL EVIDENCE

(71) Applicant: Research Foundation of the City University of New York, New York, NY (US)

(72) Inventor: Shweta Jain, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 42 days.

(21) Appl. No.: 16/849,058

(22) Filed: Apr. 15, 2020

(65) Prior Publication Data

US 2020/0336907 A1 Oct. 22, 2020

Related U.S. Application Data

(60) Provisional application No. 62/834,680, filed on Apr. 16, 2019.

(51) Int. Cl.
*H04L 29/06* (2006.01)
*H04W 12/069* (2021.01)
(Continued)

(52) U.S. Cl.
CPC ......... *H04W 12/069* (2021.01); *H04L 9/3236* (2013.01); *H04L 9/3263* (2013.01);
(Continued)

(58) Field of Classification Search
CPC . H04W 12/069; H04W 12/63; H04W 12/104; H04W 12/106; H04W 12/02;
(Continued)

(56) References Cited

U.S. PATENT DOCUMENTS 6,269,446 B1 * 7/2001 Schumacher ...... H04N 1/32128
380/30
7,236,596 B2 * 6/2007 Prokoski ............... H04L 9/3297
380/258

(Continued)

OTHER PUBLICATIONS

Gonzalez-Tablas Ferreres, A. et al.; Spatial-Temporal Certification Framework andExtension of X.509 Attribute Certificate Framework and SAML Standard to Support Spatial-Temporal Certificates; EuroPKI'07: Proceedings of the 4th European conference on Public Key Infrastructure: theory and practice; Jun. 28, 2007; 9 pages.

(Continued)

*Primary Examiner* — Andrew J Steinle
*Assistant Examiner* — Hassan A Hussein
(74) *Attorney, Agent, or Firm* — Timothy P. Collins; Schmeiser, Olsen & Watts, LLP

(57) ABSTRACT

A digital media authentication system comprises a media processing application executed by a mobile electronic device that computes a robust image hash for media data acquired by the mobile electronic device; a location attestation system that validates a location context of the media data, the location context determined in response to an object scene in a field of view of the mobile electronic device captured for conversion to the media data; and a blockchain network that maintains a ledger entry that includes the robust image hash, an immutable timestamp, and a location certificate validating the location context of the media data.

18 Claims, 6 Drawing Sheets

(51) Int. Cl.
  *H04L 9/32* (2006.01)
  *H04W 12/02* (2009.01)
  *H04W 12/63* (2021.01)
  *H04W 12/104* (2021.01)
  *H04W 12/106* (2021.01)

(52) U.S. Cl.
  CPC ........... *H04L 9/3297* (2013.01); *H04W 12/02* (2013.01); *H04W 12/104* (2021.01); *H04W 12/106* (2021.01); *H04W 12/63* (2021.01); *H04L 2209/38* (2013.01)

(58) Field of Classification Search
  CPC ... H04L 9/3263; H04L 9/3236; H04L 9/3297; H04L 2209/38; H04L 9/3239; H04L 2209/60; H04L 63/123; H04N 21/25875; H04N 21/2396; H04N 21/835
  See application file for complete search history.

(56) References Cited

U.S. PATENT DOCUMENTS

| | | | | |
|---|---|---|---|---|
| 8,068,638 | B2* | 11/2011 | Malone | H04L 9/302 |
| 10,320,807 | B2* | 6/2019 | Khan | H04L 63/126 |
| 11,062,358 | B1* | 7/2021 | Lewis | G06Q 30/0277 |
| 2003/0065922 | A1* | 4/2003 | Fredlund | H04N 1/32101 |
| | | | | 713/176 |
| 2004/0125208 | A1* | 7/2004 | Malone | H04L 9/3221 |
| | | | | 348/207.1 |
| 2015/0372988 | A1* | 12/2015 | Tredoux | H04L 63/0823 |
| | | | | 380/243 |
| 2016/0012424 | A1* | 1/2016 | Simon | G06Q 20/3674 |
| | | | | 705/67 |
| 2017/0041148 | A1* | 2/2017 | Pearce | H04L 9/3236 |
| 2017/0187525 | A1* | 6/2017 | Rosenquist | H04L 9/14 |
| 2017/0206643 | A1* | 7/2017 | Weiss | G06T 11/60 |
| 2018/0089041 | A1* | 3/2018 | Smith | G06F 16/2255 |
| 2018/0212970 | A1* | 7/2018 | Chen | H04L 63/101 |
| 2019/0065685 | A1* | 2/2019 | Pickover | H04L 9/3297 |
| 2019/0130190 | A1* | 5/2019 | Raspotnik, Jr. | G06F 21/53 |
| 2019/0166101 | A1* | 5/2019 | Ramos | H04L 9/0827 |
| 2019/0206520 | A1* | 7/2019 | Eteminan | G06F 16/278 |
| 2019/0258999 | A1* | 8/2019 | Leonard | G06Q 10/06312 |
| 2019/0303929 | A1* | 10/2019 | Brown | H04L 63/0853 |
| 2019/0319948 | A1* | 10/2019 | Triola | H04L 9/3218 |
| 2020/0014528 | A1* | 1/2020 | Nandakumar | H04L 9/3228 |
| 2020/0014529 | A1* | 1/2020 | Kanza | H04L 9/0637 |
| 2020/0380090 | A1* | 12/2020 | Marion | H04L 9/3239 |
| 2021/0092613 | A1* | 3/2021 | Palyutina | G06Q 40/04 |

OTHER PUBLICATIONS

Samanta; P. et al.; Demo:E-Witness—Preserve and Prove Forensic Soundness of Digital Evidence; MobiCom'18; Oct. 29-Nov. 2, 2018, New Delhi, India; pp. 832-834; https://doi.org/10.1145/3241539.3267720.

* cited by examiner

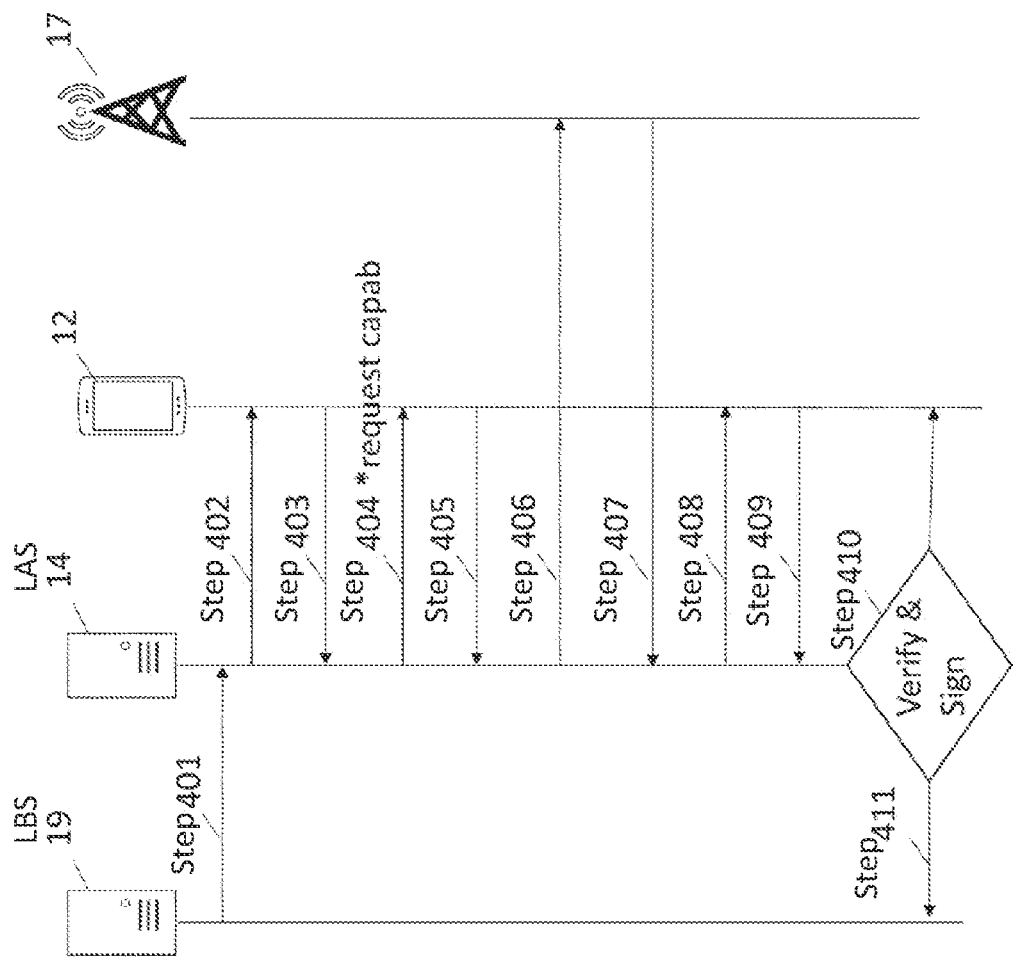

AUTHENTICATING DIGITAL EVIDENCE

RELATED APPLICATIONS

This application claims priority to U.S. Provisional Application Ser. No. 62/834,680, filed on Apr. 16, 2019 entitled "AUTHENTICATING IMAGES AND VIDEO USING BLOCKCHAIN", the entirety of which is incorporated by reference herein.

STATEMENT REGARDING FEDERALLY FUNDED RESEARCH OR DEVELOPMENT

This invention was made with government support under grant number 1742919 awarded by the National Science Foundation. The government has certain rights in the invention.

FIELD

The present concepts relate generally to the authenticity of legal evidence in a digital format, and more specifically to systems and methods that incorporate blockchain technology to provide integrity and spatio-temporal properties of digital evidence captured by a camera.

BACKGROUND

The availability of smartphones or other mobile electronic devices permits a user to capture images, videos, or related media of virtually anything in a user device's field of view. One such example may include a user's eyewitness accounts of criminal activity, police brutality, crowd riots, and so on. Video recordings or other media of such incidents can be produced at the smartphone, then uploaded to social media.

However, captured images, video, and/or audio recordings or related media content may be useful as evidence against perpetrators of a crime, police brutality, or other unlawful event when presented in court. A captured image, video, and/or audio recordings or related media content may include context data such as a time and location stamp when posted to social media, which is necessary to prove its authenticity as possible evidence in a government proceeding such as a courtroom trial or government investigation. However, the anonymity of the mobile device user who captured the content may not be assured when uploading the content to a public social media website or the like. Open source whistleblower submission secure drop sites are available to accept digital documents from anonymous sources, but may nevertheless be unsafe because the user may unwittingly leave behind a digital footprint when interacting with the online service. In doing so, the risk is present of tampering of the updated recording, for example, manipulating an object in an image. Without the proper collection and deposition of video evidence, the evidence is subject to challenge in a court of law or questioning by viewers when posted on a public forum such as social media.

Accordingly, there is a need to protect the privacy, identity, and safety of civilians, journalists, or other eyewitnesses of a possible criminal act while ensuring that evidence captured by an eyewitness smartphone or the like is forensically secure and readily available as viable evidence when adjudicating a legal dispute in a court or other government institution, or to ensure that the evidence is authentic when presented on social media.

SUMMARY

In one aspect, a digital media authentication system comprises a media processing application executed by a mobile electronic device that computes a robust image hash for media data acquired by the mobile electronic device; a location attestation system that validates a location context of the media data, the location context determined in response to an object scene in a field of view of the mobile electronic device captured for conversion to the media data; and a blockchain network that maintains a ledger entry that includes the robust image hash, an immutable timestamp, and a location certificate validating the location context of the media data.

In another aspect, a method for authenticating digital evidence comprises capturing media of interest; computing a hash of the captured media; generating a location certificate validating a location context of the captured media; and adding the location certificate, the hash, and an immutable timestamp to a blockchain including the hash, an immutable timestamp, and the location certificate.

In other aspect, a computer program product for authenticating digital evidence comprises a computer readable storage medium having computer readable program code embodied therewith. The computer readable program code comprises computer readable program code configured to capture media of interest; computer readable program code configured to compute a hash of captured media; computer readable program code configured to generate a location certificate validating a location context of the captured media; and computer readable program code configured to generate a ledger entry for a blockchain including the hash, an immutable timestamp; and the location certificate.

BRIEF DESCRIPTION OF THE DRAWINGS

The above and further advantages may be better understood by referring to the following description in conjunction with the accompanying drawings, in which like numerals indicate like structural elements and features in various figures. The drawings are not necessarily to scale, with emphasis instead being placed upon illustrating the principles of the concepts.

FIG. 6 is a flow diagram illustrating a network-based location attestation operation performed between elements of a computer security architecture, in accordance with embodiments of the present inventive concepts.

DETAILED DESCRIPTION

Figure 1:
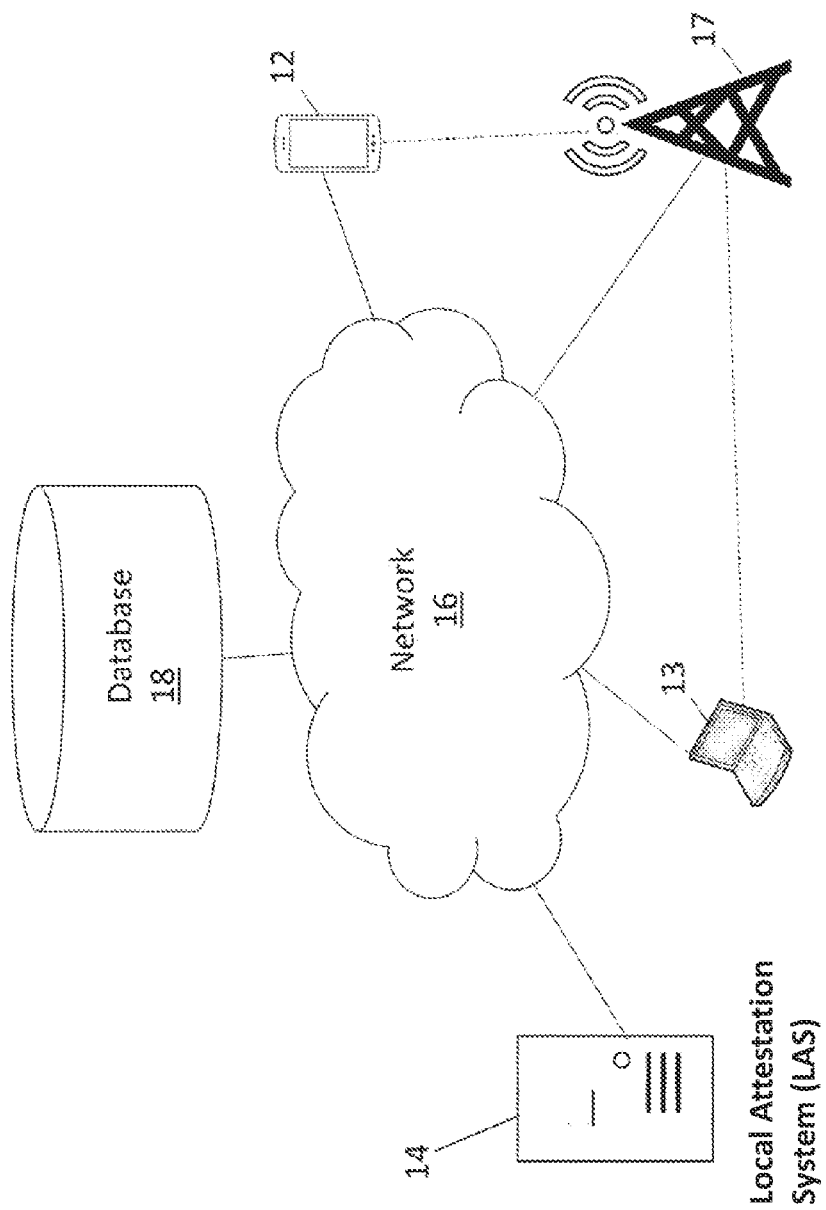
FIG. 1 is a block diagram of an environment in which embodiments of a computer security architecture are practiced.

In brief overview, embodiments of a computer security architecture provide a unique approach for authenticating digital media content such as images, video, and/or audio recordings produced by a mobile electronic device such as the camera of a smartphone. This technology is useful for journalists, eyewitnesses, crime scene or other investigators, human rights activists, insurance companies, and social media with respect to preserving privacy or anonymity.

In some embodiments, a computer security architecture include a digital media authentication apparatus, system, and method that provide immediate media authentication and preserve the authentication information on a secure and verifiable blockchain instead of complex conventional tools that implement cryptographic means to authenticate media. Accordingly, the user's device-generated digital media is secure and reliable and the user's anonymity can be maintained, while also being verifiably authentic for use as admissible evidence in a court of law, government investigation, legitimate news story, and so on.

For forensic-related applications, it is critical that the spatio-temporal evidence from photographs, videos, audio recordings or other media be authenticated, especially at their moment of capture by a camera and/or microphone. In doing so, embodiments of the digital media authentication apparatus, system, and method seek location authentication via a telecommunications network such as a cellular carrier or other wireless network, for example, a long term evolution (LTE) 4G network, but not limited thereto, which implement some or all of the digital media authentication apparatus, system, and method to enable an authenticated location and location certificate. A blockchain of the system provides a spatio-temporal alibi so that a human witness is less exposed to the risk of manipulation of the captured media when provided on social media. This is due to a blockchain feature where blocks and their contents require approval from the other nodes in the blockchain, providing the immutable proof by way of attesting to the location and time elements of the evidence. The example, a user who posts photos or videos may be exposed to "deepfakes" by bad actors who manipulate the posted media in a false or misleading manner. Further, a network-based location attestation system validates the location context of captured images or videos used as possible evidence. Accordingly, the digital media authentication apparatus, system, and method reduces the burden of forensic investigation and its corresponding processor-intensive burden on the investigator, and instead enables fast verification of three important aspects of digital evidence: integrity of the evidence file, an immutable timestamp, and a verifiable location. Another inventive feature is that the digital media authentication apparatus, system, and method does not require encryption of images in the user's smartphone itself due to the complex and processor-intensive requirements of conventional cryptography techniques, but rather is optional if there is a demonstrated need to encrypt the captured media locally.

In one use case, a citizen journalist might post a video on social media using a pseudo-identity to maintain the journalist's anonymity. In some embodiments, computer security architecture does not access, maintain, or otherwise have knowledge of the real identity of the social media user, which can assist the social media user in safeguarding the user's privacy by not de-anonymizing the user. The benefit to the social media platform derives from the ability to check the blockchain to ascertain the availability of a proof of authenticity at the time of upload. As modern technology moves toward tighter regulation to curb "fake information" or the like, the computer security architecture in accordance with the present inventive concept can assist social media platforms with gaining compliance with such regulations.

In another use case, users may instantly record ownership of media on the blockchain. Users can do so by changing the privacy defaults in the application so that at the time of registration, they provide identifying information to tie the system generated user-id, which is also stored in the ledger entry, can be associated with their real identity. This enables all social media platforms to check ownership and copyright before carrying the content on their platform. For example, all journalists reporting on behalf of news organization X, may create a copyright association for each image or video they shoot, as soon as they shoot them. Subsequently, anytime the copyrighted media is shared on a social network, the network platform will have the ability to check if the copyright attribution is correct and whether the user uploading the media has the rights to it.

FIG. 1 is a block diagram of an environment in which embodiments of a computer security architecture are practiced. A digital media authentication system of the computer security architecture comprises a media processing application stored at and executed by a mobile electronic device 12, a location attestation system 14, and a network 16 that can facilitate a blockchain.

In some embodiments, the distributive network 16 may employ a telecommunication network such as a cellular carrier, satellite, wireless, and so on, e.g., a long-term evolution (LTE) 4G network. While a 4G LTE wireless network is shown and described herein, the distributive network 16 can equally apply to other types of public and/or private wireless networks. For example, a telecommunication network may include one or more base stations or nodes 17, for example, an LTE eNodeB (4G), gNode (5G), base transceiver station (BTS) (GSM), and so on for permitting data exchanges between the mobile electronic device 12 and investigator computer 13 and/or other user equipment (UE) such as mobile handsets. The network 16 can support blockchain operations such as facilitating the sharing of network resources or access to network functions that complement or provide alternative operations. The digital media authentication system can seek location authentication through the LTE network or the like, and therefore, the security architecture can rely on a cellular carrier network to enable an authenticated location and location certificate.

In some embodiments, the distributive network 16 supports blockchain technology such as Ethereum or Quorum, which provides a consortium blockchain constructed and arranged for implementation between the participating network entities. The participants of a blockchain, referred to as consensus participants, can execute a voting-based consensus protocol which is preferable to a compute intensive process. One consensus participant generates a ledger entry from information created by the mobile electronic device 12 or other computer device capturing images, video, audio, or a combination thereof as digital evidence, such information including an image hash, location certificate and the hash of any metadata from the image. A permissioned blockchain can be maintained by partner organizations or other parties of interest, as distinguished from commercial chains, which are more expensive to maintain, require a greater amount of resources, and are prone to cyberattacks. Existing tools use cryptographic means to authenticate media even though such methods are suboptimal when applied to media.

The consensus nodes validate each transaction in a blockchain such as the abovementioned ledger contents to ensure the security and integrity of all ledger entries. The various consensus nodes can create ledger entries. For example, ledger entry 200 shown in FIG. 4 includes a hash and location timestamp generated by the mobile electronic device 12 required for the blockchain to serve as an immutable spatio-temporal alibi, described in greater detail herein. The immutable timestamp provides the time that the ledger entry is committed in the blockchain. The ledger entry 200 is added to the blockchain and executed by a consensus algorithm or the like to validate and verify transactions corresponding to blocks of a formed blockchain. The consensus algorithm manages agreements among the blockchain nodes about the current state of the distributed ledger to ensure that exchanged blockchain transactions including new blocks added to a blockchain are secured and verified. In other embodiments, the blockchain can be constructed and arranged as a public chain rather than a permissioned chain.

The media processing application 27 (see also FIG. 2) stored and executed at the mobile electronic device 12 is configured to store digital media captured by the sensor 26 for possible use as proof, for example, images, videos, or other multimedia of a crime or other event.

In some embodiments, an image hashing technique executed by the media processing application 27 extracts a short sequence from an image of the digital media to represent its contents and provide for image authentication. Unlike hash functions in cryptography that are sensitive to slight changes in the input data, the image hash is robust against normal image processing. In general, an acceptable image hash should be reasonably short, robust to ordinary image manipulations, and sensitive to tampering. Accordingly, the system uses a perceptual hash and robust image hash instead of cryptographic tools in order to authenticate captured media and to provide resiliency to compression and minor changes to captured images, for example, digital photographs captured by a journalist. A combination of the media processing application 27 and blockchain element 29 generate information for a blockchain ledger entry 200, shown in FIG. 4, including the hash and location certificate, for transmission to any consensus node in the distributive network 16. Accordingly, the hash and location certificate can be added to a blockchain. All consensus nodes can validate the transaction in the blockchain, for example, by voting or other consensus feature, to ensure the integrity and security of the ledger entry 200.

The location attestation system 14 validates the location context of the captured media for evidence when the location of the mobile electronic device 12 is recorded by on-board and untrusted sensors 26 that perform media recording functions on the mobile electronic device 12. It is important that a geographic location claimed by a user is the actual location. The validated location context can be authenticated, provide location proof, in the form of a location certificate or the like generated by a special-purpose computer server or the like of the location attestation system 14, for example, a location server such as an Enhanced Serving Mobile Location Center (E-SMLC), Home Secure User Plane Location (SUPL) Location Platform (H-SLP), or the like that processes location related measurements obtained by the mobile device 12 to estimate or determine a location for the mobile device 12. In some embodiments, features of a location attestation system 14 are described in conference paper entitled "Spatial-Temporal Certification Framework and Extension of X.509 Attribute Certificate Framework and SAML Standard to Support Spatial-Temporal Certificates" by Ana Isabel Gonzalez-Tablas Ferreres, Jose Maria De Fuentes, and Arturo Ribagorda Garnacho, dated June 2007, the contents of which are incorporated by reference in their entirety, which can contribute to the spatio-temporal authenticity of the media produced by the mobile electronic device 12.

The blockchain network 16 maintains ledger entries to provide an immutable timestamp of the authenticated media, for example, a timestamp indicating when a ledger entry was created, or the time the ledger entry is committed in the blockchain, which can be shared with the computer 13 of an investigator or other interested party. The investigator computer 13 can query the blockchain to find a corresponding ledger entry that verifies the integrity of the media and allows the blockchain to serve as an immutable spatio-temporal alibi, which is desirable for forensic verification. The blockchain formed to secure digital evidence can be maintained by a third party, such as a non-profit organization, social activist organization, and so on. In some embodiments, the ledger entry is queried from a Quorum chain or the like.

In some embodiments, the consensus nodes are constructed and arranged to update a database 18, permitting the data immutability and tamper-proof abilities of blockchain technology to share the database 18 with various public electronic devices without any security concerns with respect to illicit data manipulation and deletion. The database 18 is accessible to all eligible nodes for storing transaction address information regarding transactions, for example, information about a block chained to a blockchain, smart contracts and their application binary interfaces (ABIs), which includes program code for encoding/decoding data with respect to a machine code-level program module, for example, encoding smart contracts, for example, Ethereum contracts, and retrieving transactions from a blockchain. The database 18 can be a cloud-based database, SQL, or other database technology known to one of ordinary skill in the art. In some embodiments, the database 18 is a common database for maintaining subscriber information in a single place. In other embodiments, the database 18 is a blockchain-based distributed database, where such information is stored in the blockchain itself.

In some embodiments, each participating blockchain node on behalf of a UE such as device 12 and/or 13 has access to the database 18. In some embodiments, one or more nodes monitor the copy of their blockchain ledger for updates. For example, when a determination is made that the number of blocks in the ledger increases, a script is automatically executed at a node, which generates a request that is output to the database 18 for the transaction address and ABI of the new block.

Figure 2:
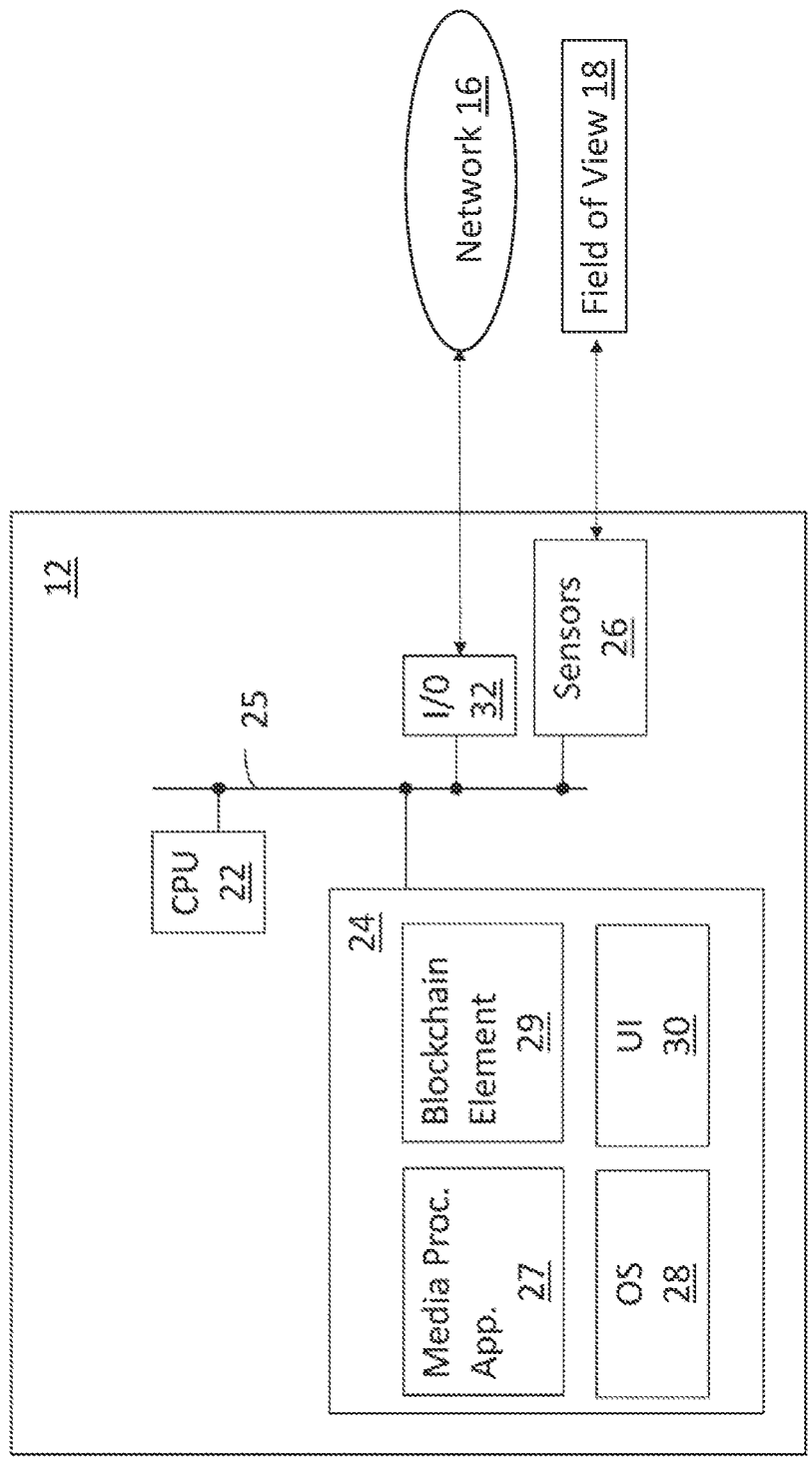
FIG. 2 is a block diagram of an eyewitness mobile electronic device, in accordance with embodiments of the present inventive concepts.

FIG. 2 is a block diagram of an eyewitness mobile electronic device 12, in accordance with embodiments of the present inventive concepts. The eyewitness mobile electronic device 12 includes a processor such as a CPU 22, a memory 24, and input/output (I/O) logic 32, for example, a computer network interface, which communicate with each other via a data/control bus and/or data connector 25, for example, a peripheral component interconnect (PCI) bus. The I/O logic 32 can include one or more adaptors or interfaces for communicating with the blockchain network 16, a wireless network such as LTE 17, of a combination thereof. The device 12 can also include one or more sensors 26 that collect images, video, and/or audio of interest, for example, used a digital evidence described herein.

The memory 24 can include volatile memory, for example, random access memory (RAM) and the like, and/or non-volatile memory, for example, read-only memory (ROM), flash memory, and the like. The memory 24 can include removable and/or non-removable storage media implemented in accordance with methods and technologies known to those of ordinary skill in the art for storing data. Stored in the memory 24 can include program code, such as program code of the abovementioned media processing application 27, an operating system (OS) 28, blockchain element 29, and a user interface 30, some or all of which can be executed by the CPU 22 and/or other hardware processors of the mobile electronic device 12. In some embodiments, one or more of the media processing application 27, operating system (OS) 28, blockchain element 29, and user interface 30 are implemented as one or more computer chips, each with a standalone processor.

The operating system 28 functionally organizes the device 12 by executing operations, software processes, and the like, which may include blockchain registration functions performed in collaboration with the blockchain element 29. The blockchain element 29 is constructed and arranged to create an image hash, timestamp(s), and metadata hash for output to a consensus node that generates a ledger entry, and in doing so, stores and executes blockchain algorithms related to registration, authentication, session establishment, and so on, and corresponding blockchain records, for example, a blockchain with hash values derived from a public-private key pair assigned to the mobile device 12. In some embodiments, the blockchain element 29 includes a hash generator (not shown) that generates a robust image hash computed of one or more digital images, videos, and/or other media, and a corresponding location certificate. The ledger entries can be synchronized, for example, accessible for an investigator computer 13 which can compute the robust hash of the file and query the blockchain to find the corresponding ledger entry to verify the file's integrity and to preserve the immutability of the blockchain. Although the mobile electronic device 12 may include a blockchain element 29, the blockchain element 29 is constructed and arranged to form data for processing by a blockchain consensus node, but the mobile electronic device 12 is preferably not itself a blockchain consensus node due to the processor-intensive computational requirements of a blockchain consensus node. Instead, a consensus node communicates with the mobile electronic device 12 to create a ledger entry from the data processed by and output from the mobile electronic device 12 to the consensus node.

Figure 3:
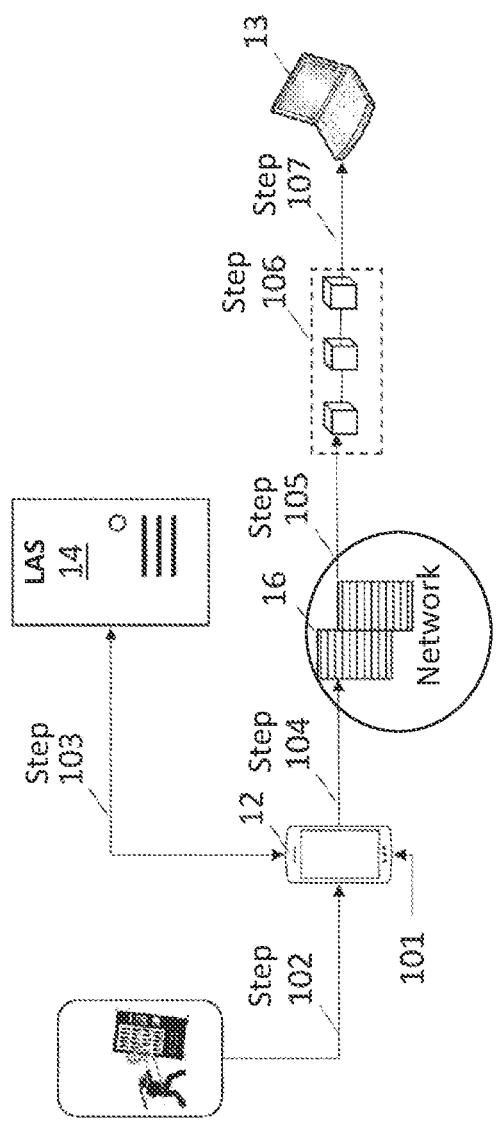
FIG. 3 is a block diagram illustrating a data flow exchange between computer-based elements of the digital media authentication system of FIGS. 1 and 2, in accordance with embodiments of the present inventive concepts.

FIG. 3 is a block diagram illustrating a data flow exchange between computer-based elements of the digital media authentication system of FIGS. 1 and 2, in accordance with embodiments of the present inventive concepts.

In step 101, a mobile electronic device 12, in this example, a smartphone, is configured to store and execute a media processing application 27 (see FIG. 2). Prior to use, the application 27 when executed can generate a user request, for example, displayed by a user interface 30 of the mobile electronic device 12 that requests the user to register with the system. System registration may include the mobile electronic device 12 transmitting appropriate information such as a unique identification to the digital media authentication system. In some embodiments, the system further includes a registration server that provides gating functions, by communicating with the application to determine that the application is legitimate and secure. The blockchain element 29 has its own registration information where a public key and password are required to send transactions to a smart contract. Accordingly, only users of an authenticated applications can register with this blockchain element. In some embodiments, the functionality of the blockchain element 29 and registration server can be merged together into one blockchain element. Registration information may include but not be limited to a smart contract transaction or an independent authentication provider. In some embodiments, a registration server (not shown) includes a cloud database 18, which examines a set of application programming interface (API) keys before allowing any registration or authentication queries to the database 18. The user can register with the system in this manner to create a pseudo identity to preserve the privacy of the user. During the registration process, a pseudo-identity may be created using any known technique such as by processing a cryptographic hash of information entered by the user such as a passcode or phrase. This hash may be used as a pseudo-identity. The system ensures the uniqueness and authenticity of this identity. In some embodiments, a pseudo-identity is automatically generated by an application development platform such as the Google Firebase™ mobile and web application development platform. The pseudo identity is tied to the user of the application 27 as long as the user is signed in to use the application 27 installed on the smartphone 12. If the user signs out and another user registers using the application 27 on the same device, a new pseudo-identity will be created for the new user both in the registration server and in the blockchain entity.

For example, a blockchain proof of concept (PoC) may be provided in which two entities are provided for registration. The first is Google Firebase™ or the like that is part of and performs some or all functions of a registration server or exchanges data with a standalone registration server. The API ensures that the registering entity is using an authentic application, and not another side application created to process the same functions. The second is the blockchain entity which creates a unique public key and password for the user to send transactions to the smart contract. Both identities are pseudo identities and the blockchain entity is always a pseudo identity. However, in some embodiments, a user may select identifying information to create an account at the Google Firebase™ platform. If so, then a request can be made to deanonymize since the real identity will be available in Google Firebase™ or the like which will point to the pseudo identity in the ledger entry. For example, in an enterprise use case, the user might use a single sign on to create the pseudo identity. If the user wants to be credited for his/her work such as for copyright or professional recognition, the system allows them to make this information public.

In step 102, the sensor 26 of the smartphone 12 is used to generate media content that may require forensic proof of its authenticity, for example, a video of a criminal act used as evidence in an investigation. In some embodiments, a sensor 26 may include a camera for recording image and/or videos captured within a field of view of the camera. In other embodiments, a sensor 26 may include a microphone or the like for capturing audio from a location of the smartphone 12. The media processing application 27 stores the captured media content as digital multimedia evidence. The same mobile device that captures the media content also computes a robust image hash of the captured media content.

At step 103, the media processing application 27 requests a location certificate from the location attestation system 14. For example, the media processing application 27 may invoke an application programming interface (API) or other computer interface to the operating system 28 for requesting the location certificate that indicates a current geographic location of the smartphone 12 where the request was received. The certificate may include a signature or other verifiable indication of the source of the location information. Additional details on the use of a location certificate for authenticating a collected image, video, or the like are described with respect to FIG. 6 herein.

At step 104, the image hash and location certificate are transmitted to the distributive network 16 for generating a blockchain ledger entry. Generally, the user's mobile electronic device 12 is not a consensus node due to communication and computational requirements. However, the mobile electronic device 12 generates the information for the ledger, i.e., the image hash, location certificate and the hash of any metadata from the image, and outputs the information as electronic data to a trusted consensus node.

At step 105, a ledger entry is created by a consensus node of the blockchain, and at step 106, is added by the consensus node to the blockchain. To prevent a consensus node to arbitrarily create a ledger entry, other consensus nodes will verify that the information has a valid signature of a registered mobile electronic device 12. Another consensus node cannot modify the information sent by the mobile device 12 because the signature also proves message integrity. Since registration can only happen through a valid software (or potentially hardware), the ledger information can be deemed authentic and secure since it can be proven that the information originated from a valid endpoint, i.e., the mobile electronic device 12.

At step 107, the block, or more specifically, the immutable contents of the ledger entry, can be subsequently fetched for investigation so that an interested party can use the video or the like as forensically sound digital evidence. Each node has a copy of the blockchain and can therefore perform a mining operation for the added block validating the transaction. The investigator computer 13 can validate the transaction by computing the robust hash of the file and querying the blockchain to find the corresponding ledger entry to verify the contents' integrity. From the timestamp of the ledger entry, the investigator is assured that the evidence was captured at a time no later than the time included in the timestamp, i.e., proof of authenticity at the time of creating of the ledger entry. In addition, the location certificate provides the investigator the assurance that the media for evidence was indeed captured by the mobile device 12 at the location identified by the data in the location certificate.

Figure 5:
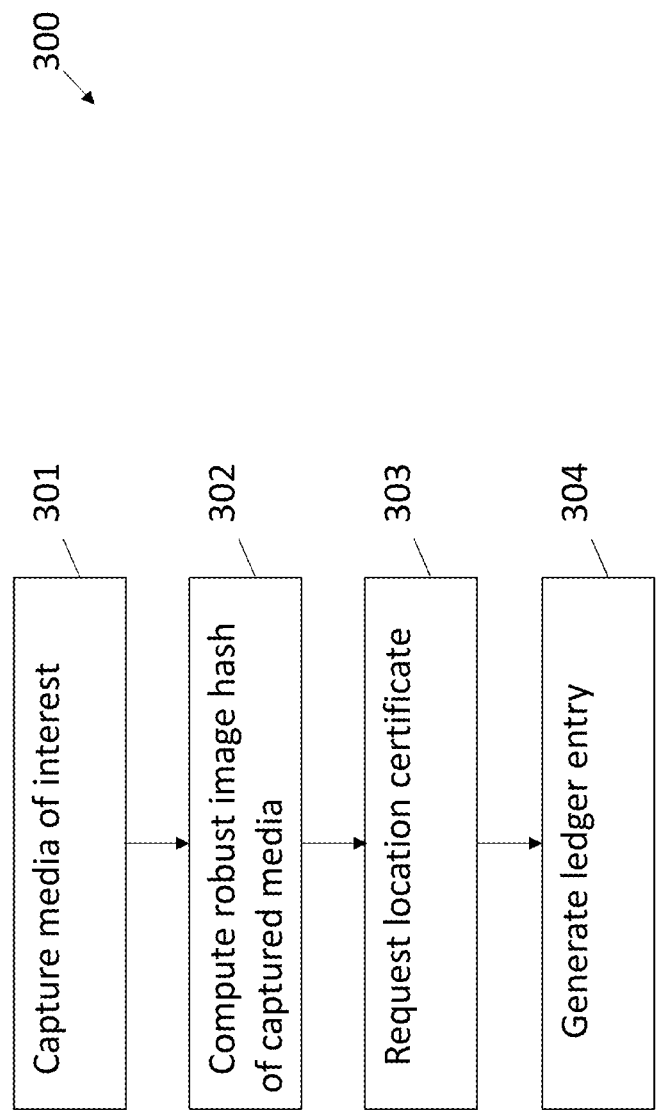
FIG. 5 depicts a flow chart of a method for media authentication, in accordance with embodiments of the present invention.

FIG. 5 depicts a flow chart of a method 300 for media authentication, in accordance with embodiments of the present invention. An intended use of this captured media may be for evidence-related reasons, and therefore must be authentic in order to assure the forensic soundness of the digital evidence.

At block 301, the media, e.g., images, video, and/or audio of interest, is captured by a media capturing device, such as a user computer such as a smartphone, electronic tablet, laptop computer, and so on.

At block 302, a robust image hash is computed of the captured media.

At block 303, proof of location in the form of a location certificate is requested. In some embodiments, the location certificate is secured by encryption.

Figure 4:
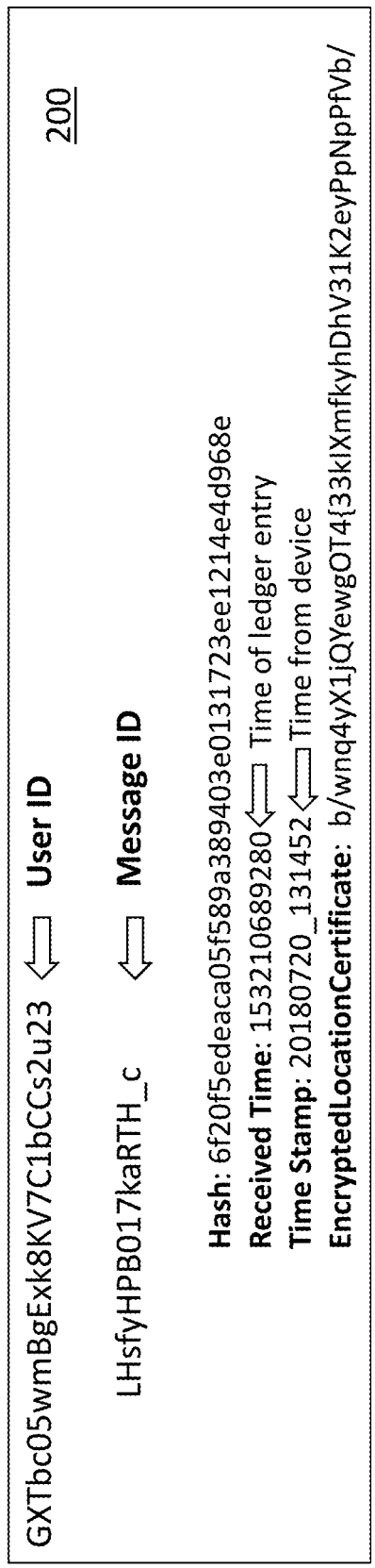
FIG. 4 is a view of a blockchain ledger entry of the digital media authentication system of FIGS. 1-3, in accordance with embodiments of the present inventive concepts.

At block 304, a ledger entry is generated. As shown in FIG. 4, the ledger entry 200 can include the hash computed at block 302 and the location certificate received at block 303.

Accordingly, the ledger entry is constructed and arranged for addition to a digital evidence blockchain. A subsequent user may rely on the ledger entry to verify the contents' integrity. From the timestamp on the ledger entry, the user is assured of the time when the evidence was captured. The location certificate assures the user that the evidence was indeed captured at the location identified in the ledger entry. The integrity and space-time attributes of a blockchain file including the captured media evidence are therefore verified. For example, media news organization implementing the digital media authentication system may create a blockchain ledger entry stamping the news organization's copyright and ownership of the content. This same media may possibly preexist in another previous ledger entry because a photographer of the news organization also used the digital media authentication system. Accordingly, a chain of custody type tracking of the media can be provided.

FIG. 6 is a flow diagram illustrating a network-based location attestation operation performed between elements of a computer security architecture, in accordance with embodiments of the present inventive concepts. FIG. 6 describes in part features of the location attestation system 14 described above. However, other embodiments are not limited to the location attestation system 14, and may include the use of any location determination technique such as crowdsourced or infrastructure supported configurations so long as signal measurements are attested by the nodes that serve as references and the security of the location claim can be verified.

Referring again to FIG. 6, an LBS 19, location computer server of a location attestation system 14, and a UE such as the mobile electronic device 12 may each include a messaging interface or the like to communicate via a data communication network with each other. Communications such as message exchanges between these elements of the system may be performed according to the LTE Positioning Protocol (LPP), but not limited thereto.

The LBS 19 outputs (401) transmits a location certificate request message, for example, a request for a requested location certificate, to the location attestation system 14 for processing by the mobile electronic device 12, which is configured for capturing media content of interest. The location attestation system 14 is responsible for detecting and locating the smartphone 12 and generating location-related measurements to assist the system 14 with detecting and estimating a location of the smartphone 12. In some embodiments, the location attestation system 14 relies on telecommunication network devices of a cellular network or the like to facilitate local attestation features, proof of contact with the mobile electronic device 12 and/or other UEs, and provide an assurance of the mobile device's location by certifying location assistance data and computed location.

In response to receipt of the location request certificate message, the location server initiates (402) a communication session with the smartphone 12. In some embodiments, the session is an LPP session, but not limited thereto. In response to the session request, the smartphone 12 outputs (403) a reply that verifies and acknowledges the smartphone 12 participation in the LPP session.

The location server 14 initiates (404) outputs a request for capabilities, also referred to as a Request for Capabilities message. The smartphone 12 returns these capabilities to the location server 14, in particular, with respect to support for different positioning techniques and types of supported radio measurements.

In order to compute a location estimate from measurements provided the mobile device 12, location server 14 may further employ data related to one or more base stations 17 in the wireless network. Therefore, in addition to the smartphone 12, the location server 14 may communicate directly with the carrier, for example, an LTE base station 17. For example, the location server 14 can request (406) network assistance according to the LPP Annex (LPPa) or the like. In response, the LTE base station 17 can provide (407) assistance data. The LTE base station 17, or eNodeB, may provide signal messages during the location attestation process in a secure manner but generally not including the blockchain, for example, where the parties to an electronic communication assent to, or sign, the content of the information and the information exchange takes place using standard network security mechanisms of encryption through session key or the like.

The location server 14 provides (408) unsolicited assistance data of the processed assistance data from the base station 17 to the smartphone 12, and also requests (408) location information from the smartphone 12 Network assistance data provided by the base station 17 to the location server 14 may include the base station's GPS coordinates. The smartphone 12 may use the assistance data, e.g., processed from the data received (407) from the LTE base station 17, or eNodeB, to compute its location. For example, the smartphone 12 as a UE can measure signal power received from the base station 17, and can process the GPS coordinates to compute its own location with respect to the latitude and longitude of the base station 17. Having the satellite signal and signals from multiple base stations 17 assists the mobile device 12=triangulate itself for localization, for example, in compliance with telecommunication network standards such as the 3GPP LTE standard. In response to the receipt of the network assistance data from the location server 14, the smartphone 12 provides (409) its location information to the location server 14.

The location server 14 verifies (410) the location received from the smartphone 12. The location server 14 uses received data to compute the probable location of the smartphone 12. If this location is within an error margin of the location supplied by the smartphone 12, the server 14 may interpret the location to be correct. The location server 14 also generates a signed certification to attest the smartphone location and that all communications take place using the LPP over the LTE user plane. Finally, the location server 14 secures the location certificate, for example, encryption, and responds (411) to the LBS 19 request (401). The LBS 19 stores the secured location certificate to ensure that the location was obtained with consent by the UE and that the UE consents for the LBS 19 to record the current location, and particular, to ensure that the UE is not providing a false or inaccurate location. The location server 14 can also output (412) to the smartphone 12, which can be processed with a ledger entry for addition to the blockchain.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transient computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A digital media authentication system, comprising:
a media processing application executed by a mobile electronic device that computes a robust image hash for media data acquired by the mobile electronic device and outputs the robust image hash to a blockchain network that maintains a ledger entry that includes the robust image hash, the media processing application further generating and outputting a location timestamp required for the blockchain network to serve as an immutable spatio-temporal alibi; and
a location attestation system that validates a location context of the media data, the location context determined in response to an object scene in a field of view of the mobile electronic device captured for conversion to the media data, the location attestation system further generating a location certificate by digitally signing the location context of the media data using a private key of the location attestation system, validating and attesting to the location context of the media data and outputting the location certificate to the mobile electronic device in response to a request for the location certificate by the media processing application, the location certificate containing the digitally signed location context of the media data, encrypted and output to the blockchain network by the media processing application for addition to the ledger entry, wherein the mobile electronic device is registered to generate a pseudo identity that associates the media processing application with an identity of the user as long as the mobile electronic device is authorized to use the media processing application, and wherein a new pseudo-identity is generated for another registered user.

2. The digital media authentication system of claim 1, wherein the blockchain network includes a plurality of consensus nodes, one of which is a trusted consensus node that communicates with the mobile electronic device to receive the robust image hash, the immutable timestamp, and the location certificate and that generates the ledger entry, and wherein the other consensus nodes of the blockchain network verify that information of the media data has a valid signature of the mobile electronic device.

3. The digital media authentication system of claim 1, wherein the pseudo identity is generated from a cryptographic hash of a user-provided identifier.

4. The digital media authentication system of claim 3, wherein the user-provided identifier is stored in the ledger entry, and wherein the ledger entry is constructed for processing by a social media computing platform to confirm ownership and copyright with respect to the media data.

5. The digital media authentication system of claim 1, wherein the immutable timestamp includes a time the ledger entry is committed to a blockchain of the blockchain network and wherein a remote media storage location receiving the media data checks the blockchain network to ascertain an availability of a proof of authenticity of the media data at a time of upload to the remote media storage location.

6. The digital media authentication system of claim 1, wherein the media processing application, location attestation system performs a location authentication process including validating the location context through a cellular telecommunications network.

7. The digital media authentication system of claim 1, wherein the robust image hash authenticates the acquired media data posted at a third party storage location regardless of compression and changes to the acquired media data.

8. The digital media authentication system of claim 1, further comprising a communication interface for an investigator computer to query the blockchain network to identify the ledger entry to verify the integrity of the media data.

9. A method for authenticating digital evidence, comprising: capturing media data of interest;
computing, by a media processing application executed by a mobile electronic device, a hash of the captured media data;
generating a location certificate validating a location context of the captured media data;
adding the location certificate, the hash, and an immutable timestamp to a blockchain that maintains a ledger including the hash, an immutable timestamp, and the location certificate;
generating a location timestamp required for the blockchain to serve as an immutable spatio-temporal alibi, wherein the location certificate is encrypted and output to the blockchain for addition to the ledger entry;
registering the mobile electronic device to generate a pseudo identity that associates the media processing application with an identity of the user as long as the mobile electronic device is authorized to use the media processing application; and
generating a new pseudo-identity for another registered user.

10. The method of claim 9, further comprising:
computing and outputting by the mobile electronic device the hash of the captured media data, the location certificate, and a hash of metadata of the media data to a consensus node of a blockchain network storing the blockchain; and
generating by the consensus node a ledger entry for the hash of the captured media, the immutable timestamp, the location certificate, and a hash of metadata of the media data.

11. The method of claim 10, further comprising: verifying by other consensus nodes that the received hash of the captured media, the immutable timestamp, the location certificate, and a hash of metadata of the media data have a valid signature of the mobile electronic device.

12. The method of claim 10, wherein the pseudo identity is generated from a cryptographic hash of a user-provided identifier.

13. The method of claim 12, wherein the user-provided identifier is stored in the ledger entry, and wherein the ledger entry is constructed for processing by a social media computing platform to confirm ownership and copyright with respect to the media data.

14. The method of claim 9, wherein the immutable timestamp includes a time the ledger entry is committed to a blockchain of the blockchain network and provides a proof of authenticity of the media data at a time of upload to a remote media storage location.

15. The method of claim 9, further comprising validating the location context through a cellular telecommunications network.

16. The method of claim 9, further comprising querying, by an investigator computer, the blockchain network to identify the ledger entry to verify the integrity of the media data.

17. A computer program product for authenticating digital evidence, comprising:
a non-transitory computer readable storage medium having computer readable program code embodied therewith, the computer readable program code comprising:
computer readable program code configured to capture media of interest;
computer readable program code configured to compute a hash of captured media and output the hash to a blockchain network that maintains a ledger entry that includes the hash, and to further generate and output a location timestamp required for the blockchain network to serve as an immutable spatio-temporal alibi;
computer readable program code configured to generate a location certificate validating a location context of the captured media;
computer readable program code configured to output the location certificate in response to a request for the location certificate, the location certificate encrypted and output to the blockchain network for addition to the ledger entry;
computer readable program code configured to register a mobile electronic device to generate a pseudo identity that associates a media processing application with an identity of the user as long as the mobile electronic device is authorized to use the media processing application; and
computer readable program code configured to generate a new pseudo-identity for another registered user.

18. The computer program product of claim 17, wherein the computer readable program code further comprises:
computer readable program code configured to compute and output the hash of the captured media, the location certificate, and a hash of metadata of the media to a consensus node of the blockchain network storing the blockchain; and
computer readable program code configured to generate a ledger entry for the hash of the captured media, the immutable timestamp, the location certificate, and the hash of the metadata of the captured media.

* * * * *